(12) United States Patent
Steele

(10) Patent No.: US 7,345,464 B2
(45) Date of Patent: Mar. 18, 2008

(54) PWM POWER SUPPLY CONTROLLER HAVING MULTIPLE PWM SIGNAL ASSERTIONS AND METHOD THEREFOR

(75) Inventor: Jeremy F. Steele, Pawtucket, RI (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 264 days.

(21) Appl. No.: 10/941,611

(22) Filed: Sep. 16, 2004

(65) Prior Publication Data

US 2006/0055387 A1   Mar. 16, 2006

(51) Int. Cl.
G05F 1/00 (2006.01)
H02M 1/12 (2006.01)
H03K 7/08 (2006.01)

(52) U.S. Cl. .................. 323/288; 363/41; 332/110

(58) Field of Classification Search ........... 323/288, 323/283, 282, 351, 222; 332/109, 110, 108, 332/112, 113; 318/599; 375/238, 239; 363/41
See application file for complete search history.

(56) References Cited

U.S. PATENT DOCUMENTS

| | | | | |
|---|---|---|---|---|
| 5,168,436 A | * | 12/1992 | Barlage | 363/21.17 |
| 5,880,644 A | * | 3/1999 | Schmidt et al. | 332/109 |
| 5,886,586 A | * | 3/1999 | Lai et al. | 332/109 |
| 5,982,156 A | * | 11/1999 | Weimer et al. | 323/222 |
| 6,057,675 A | * | 5/2000 | Tateishi | 323/283 |
| 6,198,265 B1 | * | 3/2001 | Stevenson | 323/288 |
| 6,232,755 B1 | * | 5/2001 | Zhang | 323/282 |
| 6,275,018 B1 | * | 8/2001 | Telefus et al. | 323/282 |
| 6,342,822 B1 | * | 1/2002 | So | 332/109 |
| 6,577,109 B2 | * | 6/2003 | Dancy et al. | 323/272 |
| 6,624,619 B2 | * | 9/2003 | Fujita et al. | 323/288 |
| 6,696,821 B2 | * | 2/2004 | Haraguchi et al. | 323/222 |
| 6,700,359 B2 | * | 3/2004 | Daniels et al. | 323/268 |
| 6,700,803 B2 | * | 3/2004 | Krein | 363/41 |
| 6,903,948 B2 | * | 6/2005 | Yoshida et al. | 363/95 |
| 6,924,633 B2 | * | 8/2005 | Sanzo et al. | 323/283 |
| 7,002,327 B2 | * | 2/2006 | Marino et al. | 323/283 |
| 7,026,795 B2 | * | 4/2006 | So | 323/222 |
| 2003/0103361 A1 | * | 6/2003 | Krein | 363/21.1 |

* cited by examiner

*Primary Examiner*—Jeffrey Sterrett
*Assistant Examiner*—Harry Behm
(74) *Attorney, Agent, or Firm*—Robert F. Hightower

(57) ABSTRACT

In one embodiment, a PWM power supply controller asserts a PWM control signal synchronously to a clock signal of the PWM controller and also asserts the PWM control signal asynchronously to the clock signal.

19 Claims, 3 Drawing Sheets

PWM POWER SUPPLY CONTROLLER HAVING MULTIPLE PWM SIGNAL ASSERTIONS AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form pulse width modulated (PWM) power supply controllers. The pulse width modulated (PWM) controllers typically operated with a fixed clock cycle. Most PWM controllers used the beginning of the clock cycle to start regulating the output voltage and terminated the regulation at some point during the cycle when the output voltage reached a desired value. This was generally referred to a leading edge modulation. One problem with the prior implementations was output voltage regulation. Once the regulation was terminated at some point during the clock cycle, the output voltage could change but the PWM controller could not begin regulating the output voltage until the beginning of next clock cycle. Consequently, the output voltage often varied from the desired output voltage value after the regulation terminated.

Accordingly, it is desirable to have a PWM controller that has improved output voltage regulation.

For simplicity and clarity of illustration, elements in the figures are not necessarily to scale, and the same reference numbers in different figures denote the same elements. Additionally, descriptions and details of well-known steps and elements are omitted for simplicity of the description. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
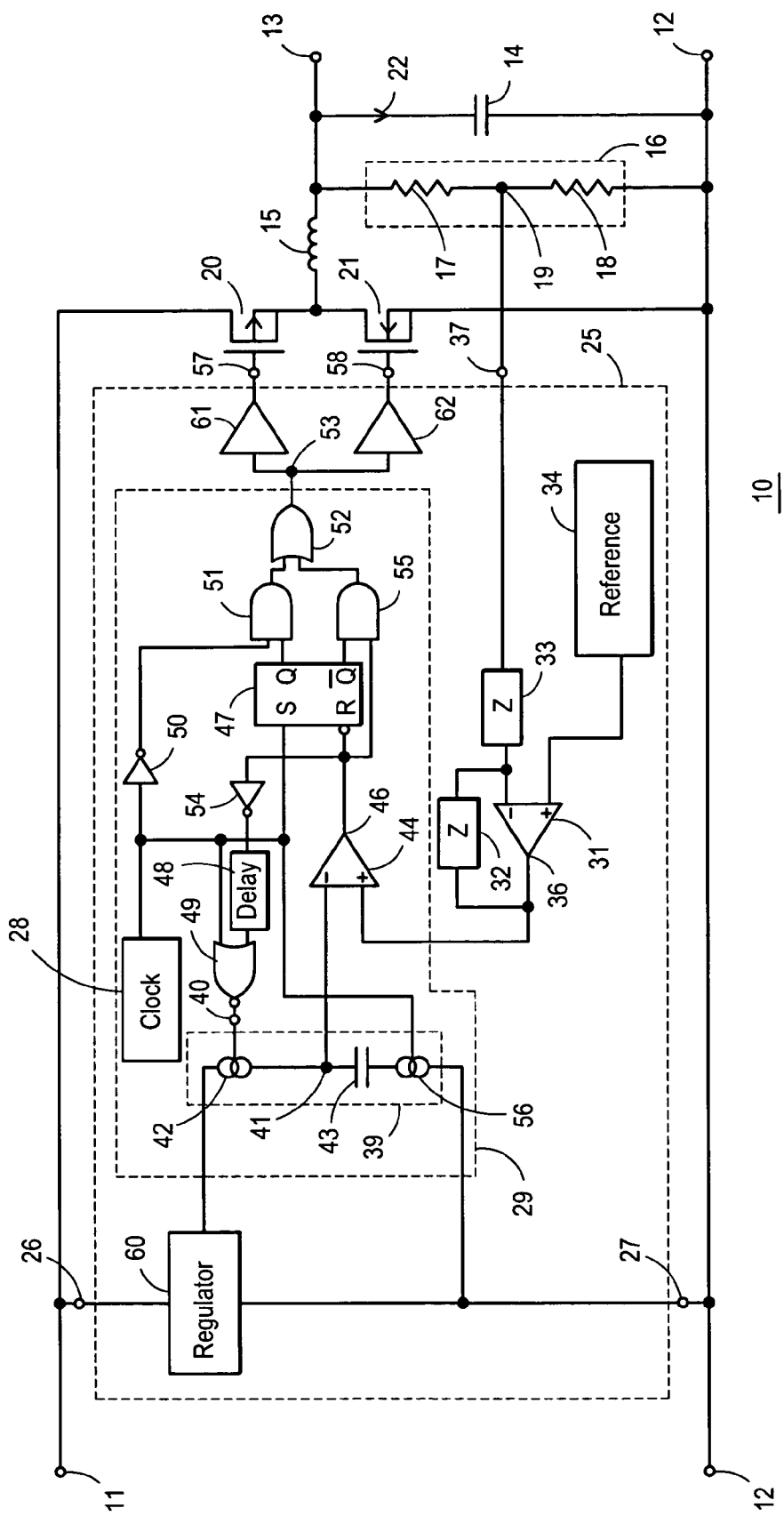
FIG. 1 schematically illustrates a portion of an embodiment of a power supply system that has a PWM controller in accordance with the present invention.

FIG. 1 schematically illustrates a portion of an embodiment of a power supply system 10 that includes a pulse width modulated (PWM) power supply controller 25. Controller 25 is configured to generate multiple output voltage regulation cycles during a single cycle of a PWM clock of controller 25. Thus, controller 25 asserts a PWM control signal a plurality of times during one cycle of a system control clock of controller 25. Power supply system 10 receives power between a power input terminal 11 and a power return terminal 12 and generates an output voltage between an output voltage terminal 13 and return terminal 12. System 10 generally includes an energy storage capacitor 14, an energy storage inductor 15, an upper power switch or upper power transistor 20, a lower power switch or power transistor 21, and a feedback network 16. Transistor 20 typically is enabled to supply a charging current 22 to charge capacitor 14 thereby regulating the value of the output voltage to a desired voltage value. Network 16 receives the output voltage and responsively generates a feedback signal that is representative of the value of the output voltage. Controller 25 is configured to receive the feedback signal on a sense input 37. In the preferred embodiment, feedback network 16 is a voltage divider having a first resistor 17 and a second resistor 18 coupled in series between terminals 13 and 12 with a feedback node 19 that is a common connection between resistors 17 and 18. Network 16 forms the feedback voltage at node 19. Inductor 15, capacitor 14, network 16, and transistors 20 and 21 typically are external to controller 25, however, in some embodiments network 16 or transistors 20 and 21 may be internal to controller 25.

Controller 25 includes a PWM controller 29, an error amplifier 31, a reference voltage generator or reference 34, an upper power switch driver 61, a lower power switch driver 62, and an internal regulator 60. Regulator 60 typically is connected between a voltage input 26 and a voltage return 27 of controller 25 in order to supply an internal operating voltage for operating the elements within controller 25 including PWM controller 29, error amplifier 31, reference 34, and drivers 61 and 62. Error amplifier 31 is configured to receive a reference voltage from reference 34 and the feedback signal from input 37 and responsively generate an error signal on an error output 36 that is representative of the difference between the value of the output voltage and the desired value of the output voltage. Amplifier 31 typically includes a frequency compensation/gain control network that includes a first impedance 32 and a second impedance 33. The frequency compensation/gain control network assists in providing stability to the control loop of controller 25. Such reference voltages, error amplifiers, and networks are well known by those skilled in the art.

PWM controller 29 receives the error signal and responsively generates a PWM control signal on a PWM output 53. The PWM control signal is suitable to enable transistor 20 to regulate the value of the output voltage. Asserting the PWM control signal enables transistor 20 and negating the PWM control signal enables transistor 21. PWM controller 29 includes a clock generator or clock 28, a ramp generator or ramp 39, a PWM comparator 44, a PWM latch 47, and a control network that facilitates controller 29 providing multiple output voltage regulation cycles during a single cycle of the PWM clock signal generated by clock 28. The control network includes a NOR gate 49, an AND gate 51, an AND gate 55, an OR gate 52, a delay network or delay 48, and inverters 50 and 54. Ramp 39 is formed or configured to generate a ramp signal having a sloped rising edge and a substantially vertical trailing edge. Additionally, ramp 39 is also formed or configured so that the ramp signal may be paused or suspended during the generation of the sloped edge and re-enabled to continue generating the sloped rising edge. While the ramp signal is suspended, the value of the ramp signal remains substantially constant at the value of the ramp signal when the suspension occurred. When the ramp signal is re-started or re-enabled, the ramp signal continues from substantially the value at which the suspension occurred. A variety of circuit configurations can be used to form ramp 39. In the preferred embodiment, ramp 39 includes a first current source 42 that is utilized to charge a capacitor 43 in order to generate the sloped rising edge of the ramp signal at a ramp output or ramp node 41. Current source 42 can be enabled or disabled by a ramp control signal that is applied to current source 42 at a ramp control input 40. Ramp 39 also includes a second current source 56 that is used to discharge capacitor 43 in order to form the substantially vertical trailing edge of the ramp signal. Current source 56 can be enabled or disabled by an enable signal that is applied to current source 56. At any point during the time that ramp 39 is generating the sloped rising edge of the ramp signal, the generation of the ramp signal may be paused or suspended by negating the ramp control signal on input 40. In the preferred embodiment, the ramp signal is suspended by forcing the ramp control signal on input 40 low which disables current source 42 thereby stopping the charging current that is used to charge capacitor 43. While the ramp signal is suspended, the voltage on capacitor 43 remains substantially constant so that the value of the ramp signal remains substantially constant. Thereafter, the ramp control signal can be re-asserted to enable current source 42 to supply the charging current to capacitor 43 and increase the value of the ramp signal. Typically, the ramp signal is disabled for a portion of a cycle of the clock signal generated by clock 28. It is desirable to configure ramp 39 so that the value of the ramp signal remains constant while ramp 39 is disabled. However, as is well known in the art there are always minor variances that prevent the value of the ramp signal from remaining exactly constant. It is well established in the art that certain variances are expected, such as variations due to semiconductor processing and variations due to temperature, and cause variances from the ideal goal of exactly constant.

Figure 2:
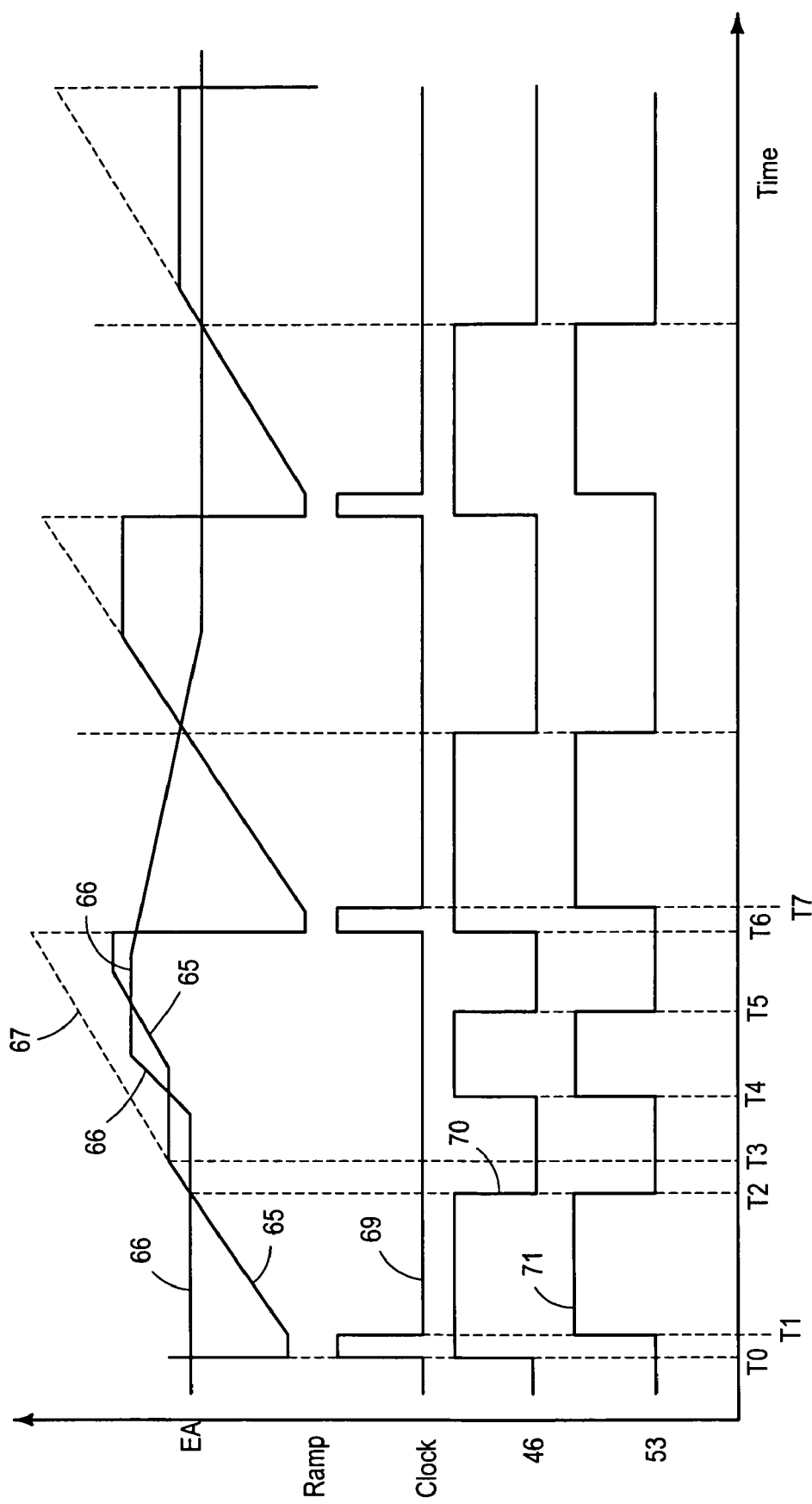
FIG. 2 is a graph having plots that graphically illustrate some signals at various points with in the PWM controller of FIG. 1 in accordance with the present invention.

FIG. 2 is a graph having plots that illustrate the relative states and amplitudes of various signals within controller 25. The abscissa indicates increasing time and the ordinate indicates relative amplitude of the various signals. This explanation has references to both FIG. 1 and FIG. 2.

Clock 28 is configured to generate a free running clock signal that generates a clock pulse at a periodic rate as illustrated by plot 69. Such clock signals and clock pulses for PWM controllers are well known to those skilled in the art. Those skilled in the art also realize that the clock signal generated by clock 28 may have other waveshapes and that the clock pulse may have other durations. For example, the clock signal may be inverted from that shown by plot 69 or the duration of the clock pulse may be different. For each of these alternate conditions, the detailed implementation of the control logic may vary in order to accommodate the alternate embodiments. A plot 65 illustrates the ramp signal from the output of ramp 39, a plot 66 illustrates the error signal from output 36 of error amplifier 31, plot 69 illustrates the clock signal formed by clock 28, a plot 70 illustrates output 46 of PWM comparator 44, and plot 71 illustrates the PWM control signal on output 53 of controller 29. A plot 67 illustrates in dashed lines the portion of the ramp signal that is not formed when ramp 39 is suspended during a cycle of the clock signal. As will be seen further hereinafter, during a first portion of a cycle of the clock signal, controller 29 functions in a synchronous or clocked PWM control mode, and in a second portion of the clock signal controller 29 is enabled to operate in an asynchronous or non-clocked PWM control mode. Although controller 29 is enabled to operate in the asynchronous PWM control mode, controller 29 typically only begins operating in the asynchronous mode if the output voltage decreases to a value that requires re-regulation during the second portion of the clock cycle.

In operation, at time T0 clock 28 generates a leading edge of a clock pulse that starts a clock cycle and ends a previous clock cycle. The high from clock 28 sets latch 47 forcing the Q output high. However, the high is blocked by gate 51 since the high clock signal also forces the output of inverter 50 low which forces the output of gate 51 low. Since the Q output is high, the Q bar output is low which forces gate 55 low thereby forcing the output of gate 52 and corresponding output 53 low to ensure that the PWM control signal is low or negated while the clock signal is high as illustrated by plot 71. The high clock signal is also received by ramp 39 which enables current source 56 to discharge capacitor 43 and reset ramp 39 so that the ramp signal is reset to a low value as illustrated by plot 65 at time T0. The rising edge of the clock pulse also forces the output of gate 49 low. The low from gate 49 is received by ramp 39 which disables current source 42 and prevents current source 42 from charging capacitor 43 thereby ensuring that capacitor 43 is quickly discharged and that the ramp signal is quickly reset to a low value that is close to the value of return 27. Resetting the ramp signal forces output 46 of comparator 44 high as indicated by plot 70 at time T0. The high from comparator 44 forces the output of inverter 54 low and after a brief delay through delay 48, the low is received by gate 49 which has no effect on gate 49 since the clock signal is high. The low from comparator 44 is also received by gate 55 which has no effect on gate 55 since the Q bar output of latch 47 is low. At time T1, the clock signal goes low. The low clock signal forces gate 51 high thereby forcing output 53 high and asserting the PWM control signal through gate 52. Thus, PWM controller 29 generates a PWM control signal that is suitable to drive transistor 20, through driver 61, and starts a first regulation cycle of the output voltage. The low clock signal is also received by ramp 39 which disables current source 56 and terminates discharging of capacitor 43. Gate 49 receives the low clock signal and forces the output of gate 49 high since output 46 of comparator 44 is already high. The high from gate 49 is received by ramp 39 which enables current source 42 to begin charging capacitor 43 and initiate the generation of the sloped rising edge of the ramp signal as illustrated by plot 65. At time T2, the value of the ramp signal increases to a value that is approximately equal to the value of the error signal on output 36 of amplifier 31 which forces output 46 of comparator 44 low as indicated by plot 70. The low from output 46 resets latch 47 forcing the Q output low and forcing the output of gate 51 low. Since output 46 of comparator 44 is low, the output of gate 55 is also low. The low from gates 51 and 55 forces output 53 low. The low from output 46 of comparator 44 also forces the output of inverter 54 low. After a delay through delay 48, the low from comparator 44 forces the output of gate 49 low. The low from gate 49 is received by ramp 39 which disables current source 42 thereby suspending the charging of capacitor 43 and suspending the ramp signal at a first value. Delay 48 allows the value of the ramp signal to increase slightly past the value of the error signal from amplifier 31. Thus, the first value of the ramp signal is just greater than the value of the error signal received from output 36 of amplifier 31. Allowing the value of the ramp signal to increase past the value of the error signal prevents small noise perturbations from causing oscillations in the operation of controller 25 and in the output voltage on output terminal 13. Plot 67 graphically illustrates that without suspending the generation of the ramp signal, the ramp signal would continue to increase and have a waveform as illustrated by the dashed line of plot 67. Thus, PWM controller 29 terminates the first clocked or synchronous regulation cycle that is formed within a first portion of this first cycle of the clock signal.

At time a T3, a load transient causes the value of the output voltage to decrease thereby causing a corresponding decrease in the value of the feedback signal and a corresponding increase in the value of the error signal on output 36. The value of the error signal increases sufficiently until the value becomes substantially equal to the first value of the ramp signal at a time T4 thereby forcing output 46 of comparator 44 high again as illustrated by plot 70. Since latch 47 is already reset, the Q output remains low and the Q bar output remains high. The high output from comparator 44 forces gate 55 high and forces output 53 high through gate 52. Controller 25 re-generates the PWM control signal that is suitable to drive transistor 20 and re-enables the regulation of the output voltage. Thus, controller 25 generates a second output voltage regulation cycle within one period of the clock signal of PWM controller 29. This second output voltage regulation cycle is generated during a second portion of the clock period during which controller 29 operates in a non-clocked mode. In this non-clocked mode the PWM control signal is asserted responsively to the error signal, thus, asserted asynchronously to the clock signal.

At a time T5 the value of the ramp signal increases to substantially the same value as the value of the error signal, thus, output 46 of comparator 44 goes low again as illustrated by plot 70. Since latch 47 is reset, the low from output 46 forces the output of gate 55 low thereby forcing the PWM control signal at output 53 low as illustrated by plot 71. The low on output 46 also disables ramp 39 to once again suspend the ramp signal at a second value that is just greater than the new value of the error signal as illustrated by plot 65 just after time T5. Once again, delay 48 ensures that the second suspended value of the ramp signal is just greater than the new value of the error signal at the second time that the ramp signal is suspended. As can be seen, controller 29 can generate any number of output voltage regulation cycles during the second portion of the period of the clock signal. For example, controller 29 may limit the number of output voltage regulation cycles to one during the second portion of the clock signal. At a time T6, clock 28 generates a second clock pulse that terminates the first clock cycle and initiates a subsequent clock cycle as indicated by plot 69. Thus, it can be seen that within a first portion of the first period or cycle of the clock signal, controller 29 asserts the PWM control signal synchronously to the clock signal, and asserts the PWM control signal asynchronously to the clock signal within a second portion of the same clock cycle.

The rising edge of the clock signal sets latch 47 forcing the Q output high and the Q bar output low. The high clock signal forces the output of gate 51 low thereby blocking the high from latch 47. Since the Q bar output is low, the output of gate 55 is low and blocks the output of comparator 44 from affecting output 53. The lows from gates 51 and 55 force gate 52 and corresponding output 53 low thereby initiating the generation of a PWM control signal that is suitable to drive transistor 20 and supply charging current 22 to charge to charge capacitor 14 and maintain the output voltage at the desired value. The high clock signal also forces gate 49 low and ramp 39 responsively disables current source 42. The high clock signal enables ramp 39 to reset the ramp signal to the low value. Resetting the ramp signal forces output 46 of comparator 44 high. At a time T7, the clock signal goes low and the clock cycle continues as previously explained in the description of the operation during the previous cycle of the clock signal.

In order to implement the previously described operation, the output of reference 34 is connected to a non-inverting input of amplifier 31. Sense input 37 is coupled to an inverting input of amplifier 31 through impedance 33. Output 36 of amplifier 31 is connected to a non-inverting input of comparator 44 and to a first terminal of impedance 32. The second terminal of impedance 32 is connected to the inverting input of amplifier 31. An inverting input of comparator 44 is connected to the ramp signal output of ramp 39. Output 46 of comparator 44 is commonly connected to the reset input of latch 47, a first input of gate 55, and an input of inverter 54. The set input of latch 47 is commonly connected to the clock signal output of clock 28, an input of inverter 50, to a first input of gate 49, and a reset input of both ramp 39 and current source 56. A second input of gate 49 is connected to the output of delay 48 which has an input connected to the output of inverter 54. The output of gate 49 is connected to input 40 of ramp 39. The Q output of latch 47 is connected to a first input of gate 51 and a second input of gate 51 is connected to the output of inverter 50. An output of gate 51 is connected to a first input of gate 52 and a second input of gate 52 is connected to an output of gate 55. A second input of gate 55 is connected to be Q bar output of latch 47. An output of gate 52 is connected to output 53 and to an input of drivers 61 and 62. An output of driver 61 is connected to PWM drive output 57 and an output of driver 62 is connected to PWM drive output 58. A first terminal of current source 42 is connected to receive the operating voltage from regulator 60 and an output of current source 42 is commonly connected to node 41 and a first terminal of capacitor 43. A control input of source 42 is connected to input 40 of ramp 39. Second terminal of capacitor 43 is connected to a first terminal of current source 56 and a second terminal of current source 56 is connected to return 27.

Figure 3:
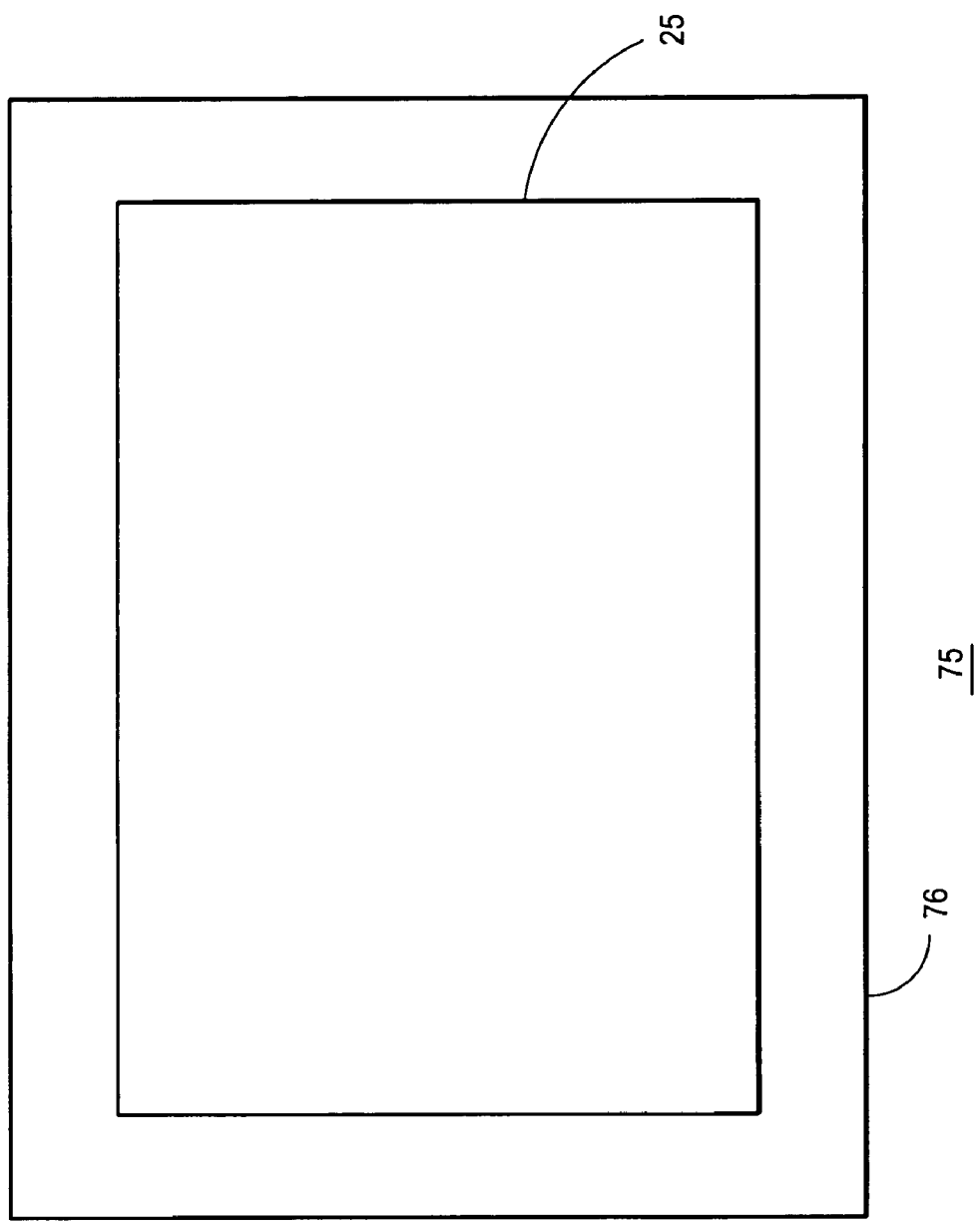
FIG. 3 schematically illustrates an enlarged plan view of a semiconductor device that includes the power system of FIG. 1 in accordance with the present invention.

FIG. 3 schematically illustrates an enlarged plan view of a portion of an embodiment of a semiconductor device 75 that is formed on a semiconductor die 76. Controller 25 is formed on die 76. Die 76 may also include other circuits that are not shown in FIG. 3 for simplicity of the drawing. Controller 25 and device 75 are formed on die 76 by semiconductor manufacturing techniques that are well known to those skilled in the art.

In view of all of the above, it is evident that a novel device and method is disclosed. Forming controller 29 to operate in the clock PWM mode for a first portion of the clock period and to operate in the non-clocked PWM mode for the second portion of the clock period facilitates controller 29 quickly responding to load transients and improves the regulation of the output voltage formed by system 10. It is believed that controller 29 can improve the output voltage regulation by as much as fifty percent over previous PWM controllers and PWM control methods. Forming ramp 39 to suspend and restart the generation of the ramp signal assists in configuring controller 29 to operate in the non-clocked PWM mode and improve the output voltage regulation.

While the invention is described with specific preferred embodiments, it is evident that many alternatives and variations will be apparent to those skilled in the semiconductor arts. For example, controller 25 is configured to use leading edge modulation, however, controller 25 may also be configured to operate with trailing edge modulation or dual edge modulation. Additionally, a specific control network with specific control logic is described for controller 29. However other control logic may be used. Additionally, a preferred embodiment of ramp 39 is described but ramp 39 may have other configurations that facilitate the desired operation of controller 25.

The invention claimed is:

1. A method of forming a power supply controller comprising:
    configuring a PWM controller to form a clock signal having a plurality of cycles with each cycle having a period; and configuring the PWM controller to assert a PWM control signal a plurality of times within a cycle of the plurality of cycles including configuring the PWM controller to maintain a value of a ramp signal at a first value responsively to an error signal and to re-enable the ramp signal responsively to the error signal, wherein each assertion of the PWM control signal has a variable duty cycle and is used to drive a power switch.

2. The method of claim 1 wherein configuring the PWM controller to assert the PWM control signal the plurality of times within the cycle includes configuring the PWM controller to assert the PWM control signal synchronously to the clock signal within a first portion of the cycle and to assert the PWM control signal asynchronously to the clock signal within a second portion of the cycle.

3. The method of claim 2 wherein configuring the PWM controller to assert the PWM control signal synchronously to the clock signal within the first portion of the cycle and to assert the PWM control signal asynchronously to the clock signal within the second portion of the cycle includes configuring the PWM controller to pause the ramp signal of the PWM controller at a first value within the first portion of the cycle and to re-enable the ramp signal within the second portion of the cycle.

4. The method of claim 3 wherein configuring the PWM controller to pause the ramp signal of the PWM controller at the first value within the first portion of the cycle and to re-enable the ramp signal within the second portion of the cycle includes configuring the PWM controller to re-enable the ramp signal responsively to an error signal.

5. The method of claim 1 wherein configuring the PWM controller to assert the PWM control signal the plurality of times within the cycle includes configuring the PWM controller to assert the PWM control signal responsively to the clock signal within a first portion of the cycle, and configuring the PWM controller to assert the PWM control signal responsively to an error signal within a second portion of the cycle.

6. The method of claim 5 wherein configuring the PWM controller to assert the PWM control signal responsively to the clock signal within the first portion of the cycle includes configuring the PWM controller to pause the ramp signal at a first value and to re-enable the ramp signal responsively to the error signal reaching at least the first value.

7. The method of claim 6 wherein configuring the PWM controller to pause the ramp signal at the first value and to re-enable the ramp signal responsively to the error signal includes disabling a current source that is charging a capacitor and re-enabling the current source responsively to the error signal.

8. A method of forming a power supply controller comprising:
configuring a PWM controller to assert a PWM control signal a plurality of times within a cycle of a clock signal of the PWM controller;
configuring the PWM controller to maintain a value of a ramp signal at a first value responsively to an error signal and to re-enable the ramp signal responsively to the error signal; and
configuring the PWM controller to pause generating the ramp signal when the error signal reaches a value that is less than the first value and to re-enable the ramp signal when the error signal changes to a value that is substantially equal to the first value.

9. The method of claim 8 wherein configuring the PWM controller to assert the PWM control signal the plurality of times within the cycle includes disabling the PWM controller from charging a capacitor and re-enabling the PWM controller to charge the capacitor.

10. A power supply control method comprising:
operating a PWM controller synchronously to a clock signal for a first portion of a cycle of the clock signal and operating the PWM controller asynchronously to the clock signal for a second portion of the cycle wherein the clock signal controls generating a first cycle of a PWM control signal of the PWM controller and a ramp signal controls generating a second cycle of the PWM control signal and including pausing the ramp signal at a substantially constant value between the first cycle and the second cycle of the PWM control signal.

11. The method of claim 10 wherein operating the PWM controller synchronously to the clock signal for the first portion of the cycle of the clock signal and operating the PWM controller asynchronously to the clock signal for the second portion of the cycle includes asserting the PWM control signal synchronously to the clock signal within the first portion of the cycle and asserting the PWM control signal asynchronously to the clock signal within the second portion of the cycle.

12. The method of claim 11 wherein asserting the PWM control signal synchronously to the clock signal within the first portion of the cycle and asserting the PWM control signal asynchronously to the clock signal within the second portion of the cycle includes asserting the PWM control signal synchronously to the clock signal, negating the PWM control signal responsively to an error signal reaching a first value and asserting the PWM control signal responsively to the error signal reaching a second value.

13. The method of claim 11 wherein operating the PWM controller synchronously to the clock signal for the first portion of the cycle of the clock signal and operating the PWM controller asynchronously to the clock signal for the second portion of the cycle includes pausing a ramp signal at a first value within the first portion of the cycle and re-enabling the ramp signal within the second portion of the cycle.

14. The method of claim 10 wherein operating the PWM controller synchronously to the clock signal for the first portion of the cycle of the clock signal and operating the PWM controller asynchronously to the clock signal for the second portion of the cycle includes asserting the PWM control signal responsively to an error signal reaching a first value.

15. The method of claim 10 wherein operating the PWM controller synchronously to the clock signal for the first portion of the cycle of the clock signal and operating the PWM controller asynchronously to the clock signal for the second portion of the cycle includes varying a value of a ramp signal within the first portion of the cycle responsively to the clock signal, maintaining the value of the ramp signal substantially constant within a second portion of the cycle responsively to an error signal, and varying the value of the ramp signal within a third portion of the cycle responsively to the value of the error signal.

16. The method of claim 15 wherein varying the value of the ramp signal within the third portion of the cycle includes varying the value of the ramp signal after the error signal reaches a second value that is established by the first value.

17. A power supply controller comprising:
a clock generator configured to generate a free running clock signal having a plurality of cycles with each cycle of the plurality of cycles having a period;

a PWM controller configured to assert a PWM control signal synchronously to a substantially fixed point within at least a first portion of the period of each cycle of the plurality of cycles; and the PWM controller configured to assert the PWM control signal asynchronously to the fixed point within a second portion of each cycle of the plurality of cycles.

18. The power supply controller of claim 17 wherein the PWM controller configured to assert the PWM control signal asynchronously to the fixed point includes the PWM controller configured to re-assert the PWM control signal asynchronously to the fixed point subsequently to asserting the PWM control signal synchronously to the fixed point.

19. The power supply controller of claim 17 wherein the PWM controller is configured to assert the PWM control signal within the second portion of the cycle responsively to an error signal of the power supply controller.

* * * * *